United States Patent

[11] 3,611,911

| [72] | Inventor | Norman L. Martin |
| | | Lake Quivira, Kans. |
| [21] | Appl. No. | 26,820 |
| [22] | Filed | Apr. 9, 1970 |
| [45] | Patented | Oct. 12, 1971 |
| [73] | Assignee | Locke Stove Company |
| | | Kansas City, Mo. |

[54] SMOKE-PRODUCING DEVICE
9 Claims, 4 Drawing Figs.

[52] U.S. Cl. ................................................. 99/259, 126/59.5
[51] Int. Cl. ................................................. A23b 1/04
[50] Field of Search .......................................... 99/259, 260, 261, 262; 126/59.5

[56] References Cited
UNITED STATES PATENTS
2,906,191  9/1959  Lee ............................ 99/259
2,984,171  5/1961  Lee ............................ 99/260

FOREIGN PATENTS
258,004  4/1949  Switzerland ................. 99/259
96,833   5/1924  Austria ....................... 99/259

Primary Examiner—Walter A. Scheel
Assistant Examiner—Arthur O. Henderson
Attorney—Fishburn, Gold & Litman ABSTRACT: A smoke-producing device for smoke flavoring food is placed within a cooking device having heat-generating means therein and positioned above a bottom wall thereof. The smoke-producing device has walls defining a chamber therein and means communicating combustion air into the smoke-producing device from outside the cooking device. A foraminous member is mounted in the smoke-producing device and spaced from the air-communicating means for supporting smoke-producing material and the smoke-producing device has a lid which is adjustable to regulate the flow of smoke therefrom.

PATENTED OCT 12 1971

INVENTOR.
Norman L. Martin
BY
Fishburn, Gold & Litman
ATTORNEYS

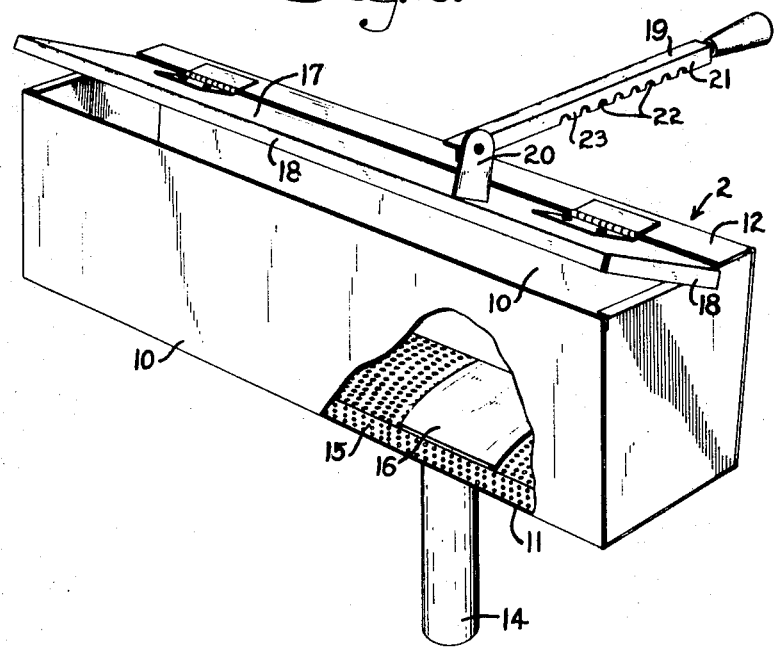
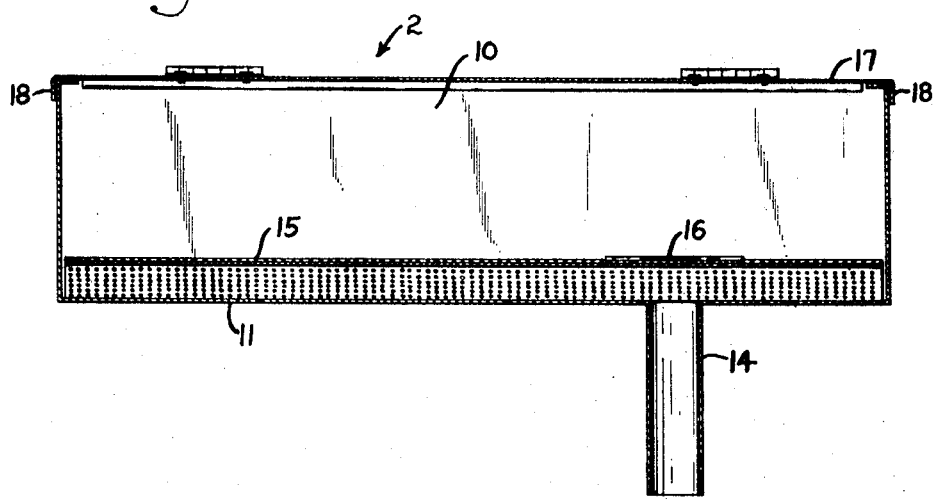

SMOKE-PRODUCING DEVICE

The present invention relates to smoke-producing devices for preparing smoked food such as meat, fish, poultry and the like in a manner suitable for human consumption.

It is common practice to smoke food, such s fresh meat, fowl and fish over a barbecue pit, grill, stove or the like. Smoke resulting from he combustion of fuel, preferably charcoal or hardwoods, such as hickory or mesquite, is often relied upon to treat the food to give it a smoked flavor. It has been found that placing the fuel by hand or with an implement directly on the fuel bed after cooking has proceeded to the desired extent results in flame burning of the fuel rather than the desired smoldering to produce smoke. In addition considerable undesirable debris and litter may be deposited on the food as a result of handling of loose chips or sawdust which is avoidable by the present invention.

It has been found that if the smoke-producing material employed to treat the food is confined within a chamber or compartment which properly restricts the amount of combustion air present, flame combustion does not occur. A restricted amount of air may be permitted to enter the chamber as smoke and fumes escape, however, the air should not be sufficient in amount to support combustion accompanied by flame burning. As the smoke-producing material is charred, fumes, vapors, and smoke are liberated and escape from the chamber to treat the food. It is noted that the terms fumes, vapors, and smoke as applied to this invention refer to the products of destructive distillation of organic material as distinguished from the fumes and smoke which result from combustion accompanied by flame burning of organic material in an atmosphere containing an excess of oxygen.

The objects of the present invention are: to provide a smoke-producing device for flavoring food which is adapted to be used within a cooking device; to provide such a smoke-producing device which is small and light and which is easily handled and cleaned; to provide such a smoke-producing device in the form of receptacle for a suitable fuel, such as sawdust, hardwood chips of hickory, mesquite or the like which will not be flame consumed or destroyed when the receptacle is placed directly on the fuel bed or heating means in a barbecue pit, grill, stove, oven or the like; to provide such a smoke-producing device which can be readily and easily recharged with fresh fuel; to provide such a smoke-producing device which is adjustable to permit smoke fumes to escape therefrom but does not permit sufficient air to enter to support combustion accompanied by flame burning; to provide such a smoke-producing device adapted to impart a regulated amount of smoke without applying heat to foods being smoked thereby eliminating the shrinkage which otherwise results from loss of moisture from the food being treated; to provide such a smoke-producing device of minimum size that will produce a great volume of smoke from a small amount of dry fuel; and to provide such a smoke-producing device particularly well adapted for the proposed use.

Other objects and advantages of this invention will become apparent from the following description taken in connection with the accompanying drawings wherein are set forth by way of illustration and example certain embodiments of this invention.

FIG. 2 is a perspective view of the smoke-producing device showing a lid in a partially open position.

FIG. 4 is a longitudinal sectional view through the smoke-producing device taken on line 4—4, FIG. 3.

Figure 1:
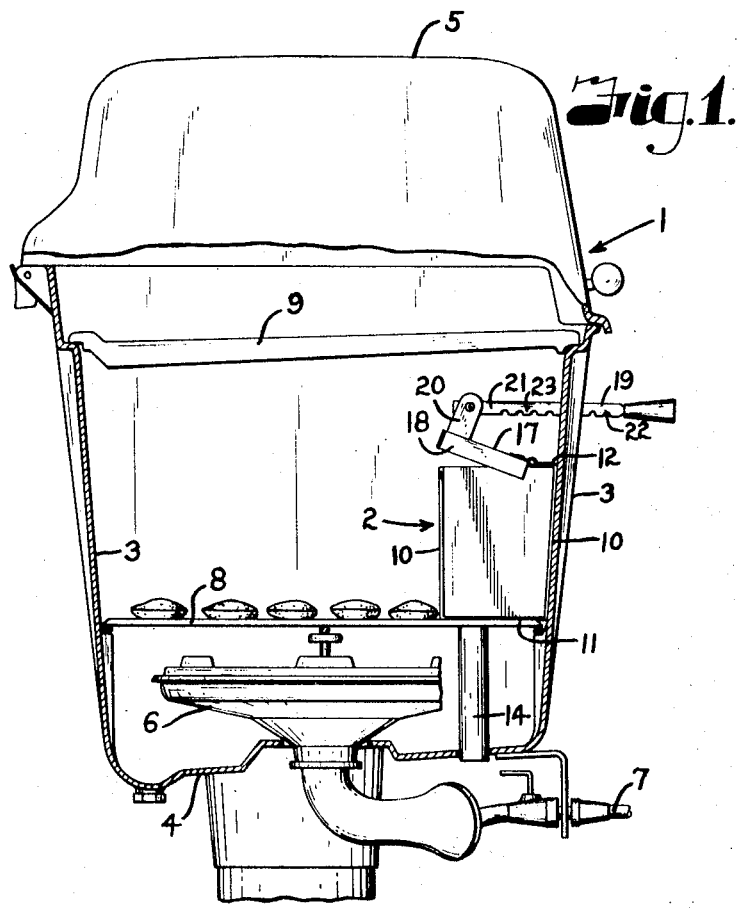
FIG. 1 is a sectional view of a cooking device having therein a smoke-producing device which embodies features of the present invention.
Figure 3:
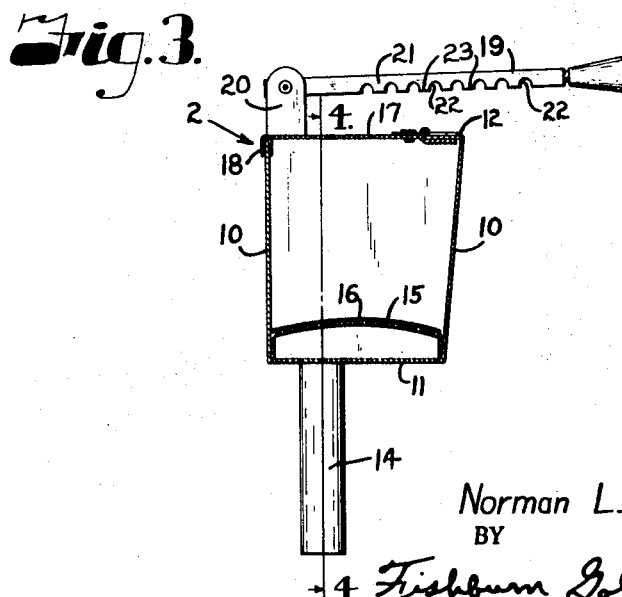
FIG. 3 is a transverse sectional view through the smoke-producing device showing the lid closed.

Referring more in detail to the drawings:

The reference number 1 generally designates a typical cooking device adapted to contain a smoke-producing device 2 therein for smoke flavoring food cooked within the cooking device 1.

The cooking device 1 may be any desired configuration, such as rectangular, and the cooking device 1 is illustrated as having sidewalls 3, a bottom wall 4, and top wall 5. The cooking device 1 has suitable heat-generating means 6 therein which in the illustrated structure is a fuel burner having a fuel supply conduit 7 communicating therewith. A grid 8 is suitably supported within the cooking device 1 and is positioned above the fuel burner. The grid 8 supports suitable briquettes preferably formed of noncombustible heat absorbing and radiating material, such as ceramic charcoal pieces.

A food-supporting grill 9 is mounted in the cooking device and spaced above the briquettes. Food, such as fresh meat, fowl, fish, or the like is placed on the grill 9 and cooked by the briquettes.

The smoke-producing device 2 is positioned within the cooking device 1 between the grid 8 and the grill 9 The smoke-producing device 2 may be any desired configuration. In the illustrated structure, the smoke-producing device 2 is rectangular and formed of sidewalls 10, a bottom wall 11 and a top wall 12.

The smoke-producing device 2 is positioned above the heat-generating means 6 and preferably supported on the grid 8 supporting the briquettes. To provide means communicating combustion air into the smoke-producing device 2 from outside the cooking device 1, I provide a tubular member 14 depending from the bottom wall 11 of the smoke-producing device 2 and extends through the bottom wall 4 of he cooking device 1.

A tray 5 is positioned within the smoke-producing device 2 and positioned above the bottom wall 11 and above an upper end of the tubular member 14 for supporting suitable smoke-producing material preferably charcoal or hardwood products, such as hickory chips, mesquite chips, sawdust or the like. It is noted that any of the woods containing tars or rosins should not be used since the taste will be imparted to the food. The tray 15 is a foraminous or perforated member extending substantially the full length of the bottom wall 11 and spaced thereabove to permit combustion air to flow into the smoke-producing device 2 and around smoke-producing material supported on the tray 15.

It is desirable to regulate flow of smoke from the smoke-producing device 2 to thereby maintain an atmosphere within the smoke-producing device 2 which will permit combustion of the smoke-producing material but will restrict the flow of combustion air into the smoke-producing device 2 so that flame burning of the smoke-producing material will not occur. Wood chips, sawdust and the like which are charred without flame burning produce ample smoke fumes that impart a delicate and desirable flavor to food. By varying the amount of smoke escaping from the device 2, the flow of air into the device 2 will be varied and controlled so that the smoke-producing material is slowly charred without flame burning.

Combustion products formed during the charring of the chips or sawdust could fall through the tubular member 14 and be deposited below the cooking device 1. A covered portion 16 is mounted on the tray 15 and is positioned in covering relation with the upper end of the tubular member 14 to prevent combustion products from entering the same.

The means for regulating the flow of smoke from the smoke-producing device 2 is illustrated as a lid portion 17 hingedly mounted on the top wall 12 of the smoke-producing device 2. The lid portion 17 has depending flange portions 18 which enclose upper edges of adjacent sidewalls 10 of the smoke-producing device 2, when the lid portion 17 is in a closed position.

A handle 19 is pivotally mounted on a standard 20 upstanding from an upper surface of the lid portion 17 and the handle 19 has a depending portion 21 which has a plurality of longitudinally spaced notches in a lower edge thereof, thereby forming ratchet teeth 23 to engage one of sidewalls 3 to position the lid portion 17 in a selected position relative to upper edges of adjacent sidewalls 10 of the smoke-burning device 2, as later described.

The handle 19 extends through the one sidewall 3 of the cooking device 1 and the ratchet teeth 23 are selectively engageable with the one sidewall 3 of the cooking device 1 to thereby vary the position of the lid portion 17 relative to the upper edges of the adjacent sidewalls 10 of the smoke-producing device 2, thereby regulating the flow of smoke from said device and regulating the inflow of combustion air through the tubular member 14.

In using the smoke-producing device 2 constructed as illustrated and described, the smoke-producing device 2 is positioned within the cooking device 1 preferably on the grid 8 above the heat-generating means 6 and preferably one sidewall 10 of the smoke-producing device 2 is in engagement with one sidewall 3 of the cooking device 1. The selected smoke-producing material, such as charcoal, hickory chips, sawdust or the like, is then placed on the tray 15 and the lid portion 17 positioned to regulate flow of smoke from the smoke-producing device 2 and to thereby regulate inflow of combustion air. The food-supporting grill 9 is then positioned in the cooking device 1 and the desired food placed thereon. The heat-generating means 6 is then activated to heat the briquettes thereby cooking the food on the grill 9 and heating the smoke-producing device 2. When the smoke-producing material is heated to ignition or combustion temperature, a charring of the smoke-producing material will occur accompanied by a production of smoke without flame burning thereof. The tubular member 14 provides a constant source of combustion air passing to the smoldering smoke-producing material. Positioning the lid portion 17 at a position slightly above the upper edges of the adjacent sidewalls 10 permits inflow of combustion air and outflow of smoke toward the grill 9 and food thereon, all without adding heat to the said food.

It is to be understood that while I have illustrated and described one form of my invention, it is not to be limited to this specific form or arrangement of parts herein described and shown.

What I claim and desire to secure by Letters Patent is:

1. A smoke-producing device for smoke flavoring food comprising:
   a. a first chamber defied by sidewalls and a bottom wall and having heat-generating means therein;
   b. a second chamber defined by sidewalls and a bottom wall and positioned within said first chamber and above said heat-generating means;
   c. means in said second chamber for supporting smoke-producing material therein;
   d. means communicating combustion air into said second chamber and around the said smoke-producing material therein, said air-communicating means including a tubular member depending from said bottom wall of said second chamber and through the bottom wall of said fist chamber; and
   e. means mounted on said second chamber to regulate the flow of smoke therefrom.

2. The smoke-producing device as set forth in claim 1 wherein:
   a. said means supporting smoke-producing material is a foraminous member positioned above said bottom wall of said second chamber; and
   b. said foraminous member has a cover portion spaced from and in covering relation with said tubular member to prevent combustion products from entering same.

3. A smoke-producing device for smoke flavoring food comprising:
   a. a first chamber having heat-generated means therein;
   b. a second chamber within said first chamber and positioned above said heat-generating means;
   c. means in said second chamber for supporting smoke-producing material therein;
   d. means communicating combustion air into said second chamber and around the smoke-producing material therein; and
   e. means mounted on said second chamber to regulate flow of smoke therefrom, said smoke-flow-regulating means including a lid hingedly mounted on said second chamber and a handle pivotally mounted on said lid and having ratchet teeth along one edge thereof and an aperture in one side of said first chamber whereby said handle extends through one sidewall of said first chamber thereby permitting said ratchet teeth to be selectively engageable with said one sidewall of said first chamber to vary the position of said lid thereby regulating the flow of smoke from said second chamber.

4. The smoke-producing device as set forth in claim 3 wherein:
   a. said first and second chambers are each defined by sidewalls and a bottom wall; and
   b. said air-communicating means is a tubular member extending through said bottom walls of said first and second chambers.

5. The smoke-producing device as set forth in claim 4 wherein:
   a. said means supporting smoke-producing material is a foraminous member positioned above said bottom wall of said second chamber; and
   b. said foraminous member has a cover portion spaced from and in covering relation with said tubular member to prevent combustion products from entering same.

6. A smoke-producing device, for smoke flavoring food, comprising:
   a. a first chamber defined by sidewalls and bottom wall and a top wall;
   b. heat-generating means in said fist chamber and spaced above said bottom wall thereof;
   c. a second chamber within said first chamber, said second chamber being defined by sidewalls and a bottom wall and a top wall;
   d. means communicating combustion air into said second chamber from outside said first chamber;
   e. a foraminous member in said second chamber spaced from said air-communicating means for supporting smoke-producing material; and
   f. means mounted on said second chamber to regulate flow of smoke therefrom.

7. The smoke-producing device as set forth in claim 6 wherein:
   a. said top wall of said second chamber has a lid portion hingedly mounted thereon;
   b. said lid portion has an elongated handle pivotally mounted thereon;
   c. said handle has ratchet teeth along one edge thereof; and
   d. said handle extends through one sidewall of said first chamber and said ratchet teeth are selectively engageable with said sidewall thereof to vary the position of said lid portion thereby regulating the flow of smoke from said second chamber into said first chamber.

8. The smoke-producing device as set forth in claim 7 wherein:
   a. said air communicating means is a tubular member extending through said bottom walls of said first and second chambers;
   b. said foraminous member is positioned above said bottom wall of said second chamber; and
   c. said foraminous member has a cover portion spaced from and in covering relation with said tubular member to prevent combustion products from entering same.

9. The smoke-producing device as set forth in claim 8 wherein:
   a. one sidewall of said second chamber is in engagement with one sidewall of said first chamber; and
   b. a food-supporting grill is mounted in said first chamber and positioned above said lid portion of said second chamber.